US010951958B1

(12) United States Patent
Arana et al.

(10) Patent No.: US 10,951,958 B1
(45) Date of Patent: Mar. 16, 2021

(54) AUTHENTICITY ASSESSMENT OF MODIFIED CONTENT

(71) Applicant: Disney Enterprises, Inc., Burbank, CA (US)

(72) Inventors: Mark Arana, Agoura Hills, CA (US); Edward C. Drake, Stevenson Ranch, CA (US); Miquel Angel Farre Guiu, Bern (CH); Anthony M. Accardo, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/737,826

(22) Filed: Jan. 8, 2020

(51) Int. Cl.
　　*G06N 3/08*　　　(2006.01)
　　*H04N 21/8352*　　(2011.01)
　　*H04N 21/8358*　　(2011.01)

(52) U.S. Cl.
　　CPC ........... *H04N 21/8352* (2013.01); *G06N 3/08* (2013.01); *H04N 21/8358* (2013.01)

(58) Field of Classification Search
　　None
　　See application file for complete search history.

(56) References Cited

U.S. PATENT DOCUMENTS

| 10,102,526 | B1 | 10/2018 | Madisetti et al. |
| 2012/0266256 | A1 | 10/2012 | Kawachiya et al. |
| 2015/0227869 | A1* | 8/2015 | Saraf ................. G06Q 10/0635 705/7.28 |
| 2016/0034298 | A1 | 2/2016 | Doane et al. |
| 2017/0052676 | A1 | 2/2017 | Pulier et al. |
| 2017/0264428 | A1 | 9/2017 | Seger, II |
| 2018/0108024 | A1 | 4/2018 | Greco et al. |
| 2019/0253256 | A1 | 8/2019 | Saab et al. |
| 2019/0266650 | A1 | 8/2019 | Chapman et al. |
| 2019/0347666 | A1* | 11/2019 | Bermudez-Cisneros .................... G06Q 20/401 |
| 2020/0134444 | A1* | 4/2020 | Chen .................... G06N 3/0454 |
| 2020/0162266 | A1* | 5/2020 | Miller .................... H04L 63/00 |

OTHER PUBLICATIONS

"Security Tip (ST04-018) Understanding Digital Signatures" (CISA 2009). (https://us-cert.cisa.gov/ncas/tips/ST04-018).

* cited by examiner

*Primary Examiner* — Eileen M Adams
(74) *Attorney, Agent, or Firm* — Farjami & Farjami LLP

(57) ABSTRACT

A system for assessing authenticity of modified content includes a computing platform having a hardware processor and a memory storing a software code including a neural network trained to assess the authenticity of modified content generated based on baseline digital content and including one or more modifications to the baseline digital content. The hardware processor executes the software code to use the neural network to receive the modified content and to assess the authenticity of each of the one or more modifications to the baseline digital content to produce one or more authenticity assessments corresponding respectively to the one or more modifications to the baseline digital content. The hardware processor is also configured to execute the software code to generate an authenticity evaluation of the modified content based on the one or more authenticity assessments, and to output the authenticity evaluation for rendering on a display.

26 Claims, 5 Drawing Sheets

AUTHENTICITY ASSESSMENT OF MODIFIED CONTENT

RELATED APPLICATION(S)

The present application is related to U.S. patent application Ser. No. 16/737,810, titled "Content Authentication Based on Intrinsic Attributes," filed concurrently with the present application, and is hereby incorporated fully by reference into the present application.

BACKGROUND

Advances in machine learning have enabled the production of realistic but forged recreations of a person's image or voice, known as "deepfakes" due to the use of deep artificial neural networks for their creation. Deepfakes may be produced without the consent of the person whose image or voice is being used, and may make the person being represented appear to say or do something that they have in fact not said or done. As a result, deepfake modified digital content can be used maliciously to spread misinformation.

Due to the widespread popularity of digital content for the distribution of entertainment and news, the effective authentication and management of that content is important to its creators, owners and distributors alike. However, as machine learning solutions continue to improve, deepfakes are and will continue to be difficult to detect. As a result, subtly modified or even entirely fake digital content may inadvertently be broadcast or otherwise distributed in violation of contractual agreement or regulatory restrictions, thereby subjecting the content owners and/or distributors to potential legal jeopardy.

SUMMARY

There are provided systems and methods for assessing authenticity of modified content, substantially as shown in and/or described in connection with at least one of the figures, and as set forth more completely in the claims. 5.

DETAILED DESCRIPTION

Figure 1:
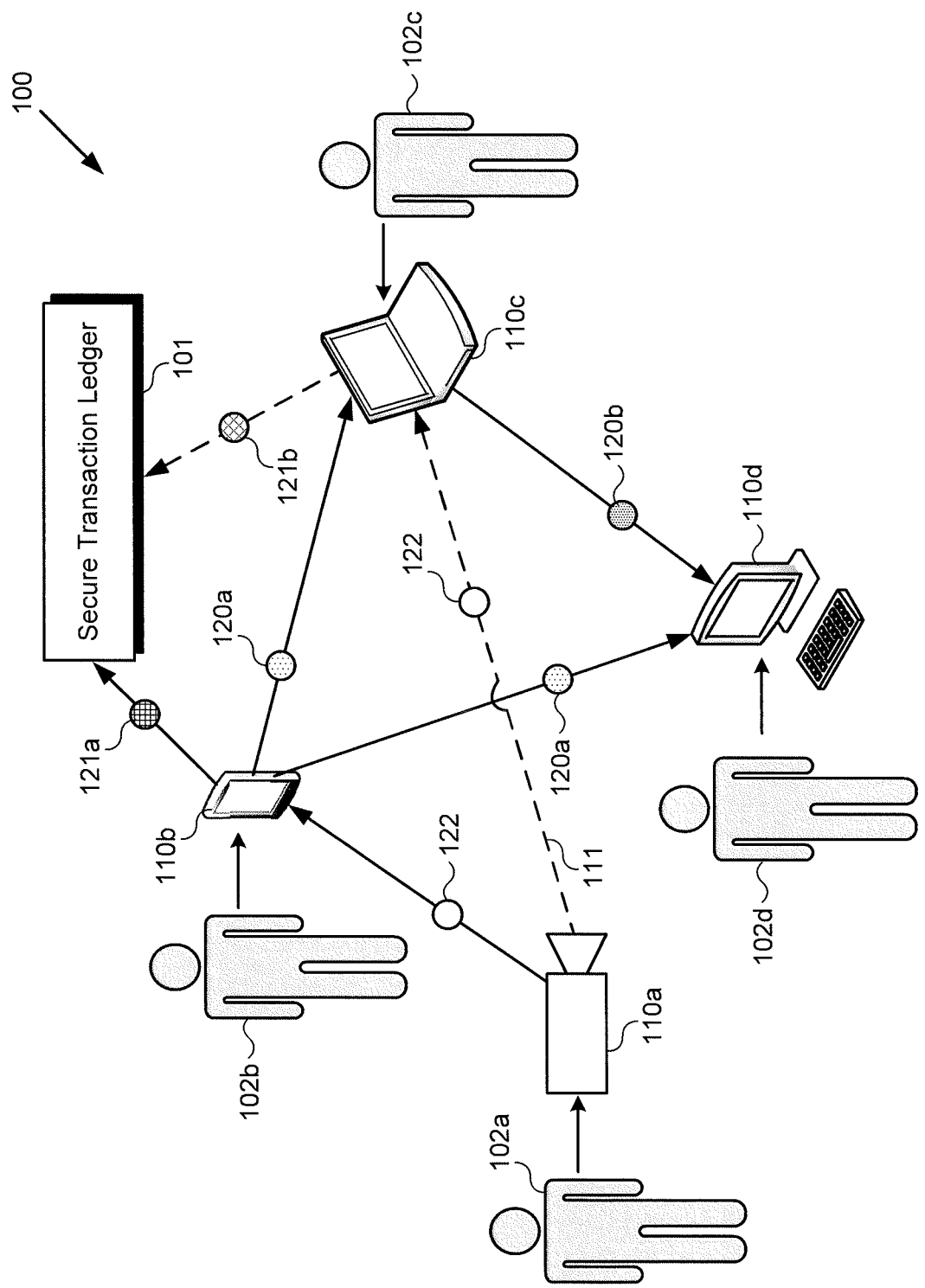
FIG. 1 shows a diagram of an exemplary use case in which baseline digital content is modified by one or more users, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for assessing authenticity of modified content that overcome the drawbacks and deficiencies in the conventional art. By using a trained neural network to assess the authenticity of one or more modifications to digital content in its originally created or "baseline" version, the present application discloses a sophisticated authentication solution enabling nuanced assessments of modified content that improves on the state-of-the-art. In addition, by generating validation data for assessing modified content based on intrinsic attributes of the one or more modifications to the underlying baseline digital content, the present solution advantageously utilizes the characteristics of each modification itself to assess its authenticity.

It is noted that, in some implementations, the present content authentication solution may be performed as a substantially automated process by a substantially automated system. It is noted that, as used in the present application, the terms "automation," "automated", and "automating" refer to systems and processes that do not require the participation of a human user, such as a system administrator. Although, in some implementations, a human system operator or administrator may review the authentication determinations made by the automated systems and according to the automated methods described herein, that human involvement is optional. Thus, the methods described in the present application may be performed under the control of hardware processing components of the disclosed automated systems.

FIG. 1 shows diagram 100 of an exemplary use case in which baseline digital content 122 is modified by user 102*b* in an authorized editing process, and may be further modified by user 102*c* in what may or may not be an authorized editing process, according to one implementation. Included in FIG. 1 are user 102*a* utilizing device 110*a*, user 102*b* utilizing device 110*b*, user 102*c* utilizing device 110*c*, and user 102*d* utilizing device 110*d*. Also shown in FIG. 1 are examples of modified content 120*a* and further modified content 120*b*. It is noted that, as defined in the present application, the expression "modified content" refers to baseline digital content 122 that has undergone one or more modifications subsequent to its creation. Furthermore, as defined herein, "authentic content" refers either to baseline digital content to which no modifications have been made, or to modified content including only modifications introduced by an authorized user of the content, such as its creator, or a user authorized to make changes to the baseline digital content.

It is noted that baseline digital content 122 may be determined as such using any suitable method, including, but not limited to the method described by U.S. patent application Ser. No. 16/737,810, titled "Content Authentication Based on Intrinsic Attributes," which, as noted above, is incorporated fully by reference into the present application. For the purposes of the present application, baseline digital content included in modified content 120*a* and/or further modified content 120*b* is that content labeled and/or described as such herein.

According to the exemplary implementation shown by FIG. 1, user 102*b* may receive baseline digital content 122 from user 102*a*. For example, user 102*b* may receive baseline digital content 122 from device 110*a* controlled by user 102*a*. User 102*a* may be a creator of baseline digital content 122, or an authorized distributor of baseline digital content 122. User 102*a* may utilize one or more microphones, and/or one or more depth sensors, and/or one or more video cameras, and/or one or more still image cameras integrated with device 110*a* to generate baseline digital content 122, for example. In various implementations, baseline digital content 122 may be video content without audio, audio content without video, or audio-video content of a movie, episodic television (TV) content that may include a web series and/or a video log, sports content, news content, or video gaming content, to name a few examples. Alternatively, in some implementations, baseline digital content 122 may take the form of a digital photograph.

It is noted that the depictions of device 110*a* as a video camera, device 110*b* as a smartphone, device 110*c* as a laptop computer, and device 110*d* as a desktop computer are merely exemplary. In various other implementations, one or more of devices 110*a*, 110*b*, 110*c*, and 110*d* (hereinafter "device(s) 110*a*-110*d*") may take the form of a tablet computer, a gaming console, a smart television (smart TV), or a wearable communication device. Moreover, when implemented as a wearable communication device, device(s) 110*a*-110*d* may take the form of an augmented reality (AR) or virtual reality (VR) headset or glasses, a smartwatch, smart ring, or any other smart personal item worn by one or more of users 102*a*, 102*b*, 102*c*, or 102*d* (hereinafter "users 102*a*-102*d*"), or situated in or on clothing worn by one or more of users 102*a*-102*d*.

As shown in FIG. 1, user 102*b* utilizes device 110*b* to receive baseline digital content 122 from device 110*a* controlled by user 102*a*, and may use device 110*b* to modify baseline digital content 122 to produce modified content 120*a*. According to the exemplary implementation shown in FIG. 1, the modification made to baseline digital content 122 is an authorized modification. In some such implementations, as shown in FIG. 1, the modification to baseline digital content 122 made by user 102*b* and device 110*b* results in editing data 121*a* describing the authorized modification being transmitted to secure transaction ledger 101 for storage and use in subsequent authentication of modified content 120*a*. It is noted that, in various implementations, secure transaction ledger 101 may take the form of a public or private secure transaction ledger. Examples of such secure transaction ledgers may include Blockchain, Hashgraph, Directed Acyclic Graph (DAG), and Holochain ledgers, to name a few.

As further shown in FIG. 1, user 102*c* may utilize device 110*c* to receive modified content 120*a* from device 110*b*, and may use device 110*c* to further modify modified content 120*a* to produce further modified content 120*b*. In some implementations in which further modification of modified content 120*a* by user 102*c* is authorized, editing data 121*b* describing the authorized further modification may also be transmitted to secure transaction ledger 101 for storage and use in subsequent authentication of further modified content 120*b*. However, when the further modification to modified content 120*a* is unauthorized, editing data 121*b* is not generated, and is not stored on secure transaction ledger 101.

Although the implementation shown in FIG. 1 depicts user 102*b* making an authorized modification to baseline digital content 122 and then forwarding modified content 120*a* to user 102*c*, that use case is merely exemplary. In other instances, user 102*c* may receive baseline digital content 122 directly from user 102*a*, as shown by dashed line 111 linking device 110*a* and 110*c* directly. That is to say, in some implementations, baseline digital content 122 may not undergo an authorized modification by user 102*b* before undergoing an unauthorized modification by user 102*c*.

Modification of baseline digital content 122 and modified content 120*a* may be performed through use of one or more content processing applications, such as audio and/or video recording or editing applications, for example, stored on devices 110*b* and 110*c*. The modification of baseline digital content 122 or further modification of modified content 120*a* may include modification of one or more segments of audio content and/or video content included in baseline digital content 122 and/or modified content 120*a*. Modification of baseline digital content 122 or modified content 120*a* may include modification of only video content, modification of only audio content, modification of only immersive content, such as a depth point cloud for use by a VR application, or modification of any combination of audio, video, and immersive content.

Where such a modification modifies video content of baseline digital content 122 or modified content 120*a*, the modification may include one or more of changing an image property of one or more video frames (e.g., contrast, brightness, etc.), deleting one or more video frames, inserting one or more video frames, removing an object from one or more video frames, inserting an object into one or more video frames, changing colors within one or more video frames, or adding metadata to one or more video frames, to name a few examples. Analogously, where a modification modifies baseline digital content 122 in the form of a digital photograph, the modification may include one or more of changing an image property of the digital photograph (e.g., contrast, brightness, etc.), removing an object from the digital photograph, inserting an object into the digital photograph, changing colors within the digital photograph, or adding metadata to the digital photograph, again to name a few examples.

Where modification of baseline digital content 122 or modified content 120*a* modifies audio content of baseline digital content 122 or modified content 120*a*, such modification may include the deletion of a portion of original audio content and/or the insertion of additional audio content, such as music or speech, for example. Alternatively, or in addition, manipulation of audio content of baseline digital content 122 or modified content 120*a* may include mixing audio tracks, changing the audio level of one or more audio tracks, or adding metadata to one or more audio tracks. Where modification of baseline digital content 122 or modified content 120*a* modifies immersive content, such as a depth point cloud captured by device 110*a* for use in a VR application, modification may include the deletion of a portion of the depth point cloud, for example.

According to the implementation shown in FIG. 1, user 102*d* utilizes device 110*d* to receive modified content 120*a* (produced by user 102*b*) from device 110*b*, or further modified content 120*b* (if produced by user 102*c*) from device 110*c*. However, in the absence of a robust solution for assessing the authenticity of modifications made to baseline digital content 122 or the further modifications made to modified content 120*a*, user 102*d* cannot be assured that modified content 120*a* or further modified content 120*b* includes only authorized modifications to baseline digital content 122. As a result, the uncertainty arising from the absence of a robust solution for assessing the authenticity of modified content may undesirably hinder the distribution, consumption, and enjoyment of authentic content.

Figure 2:
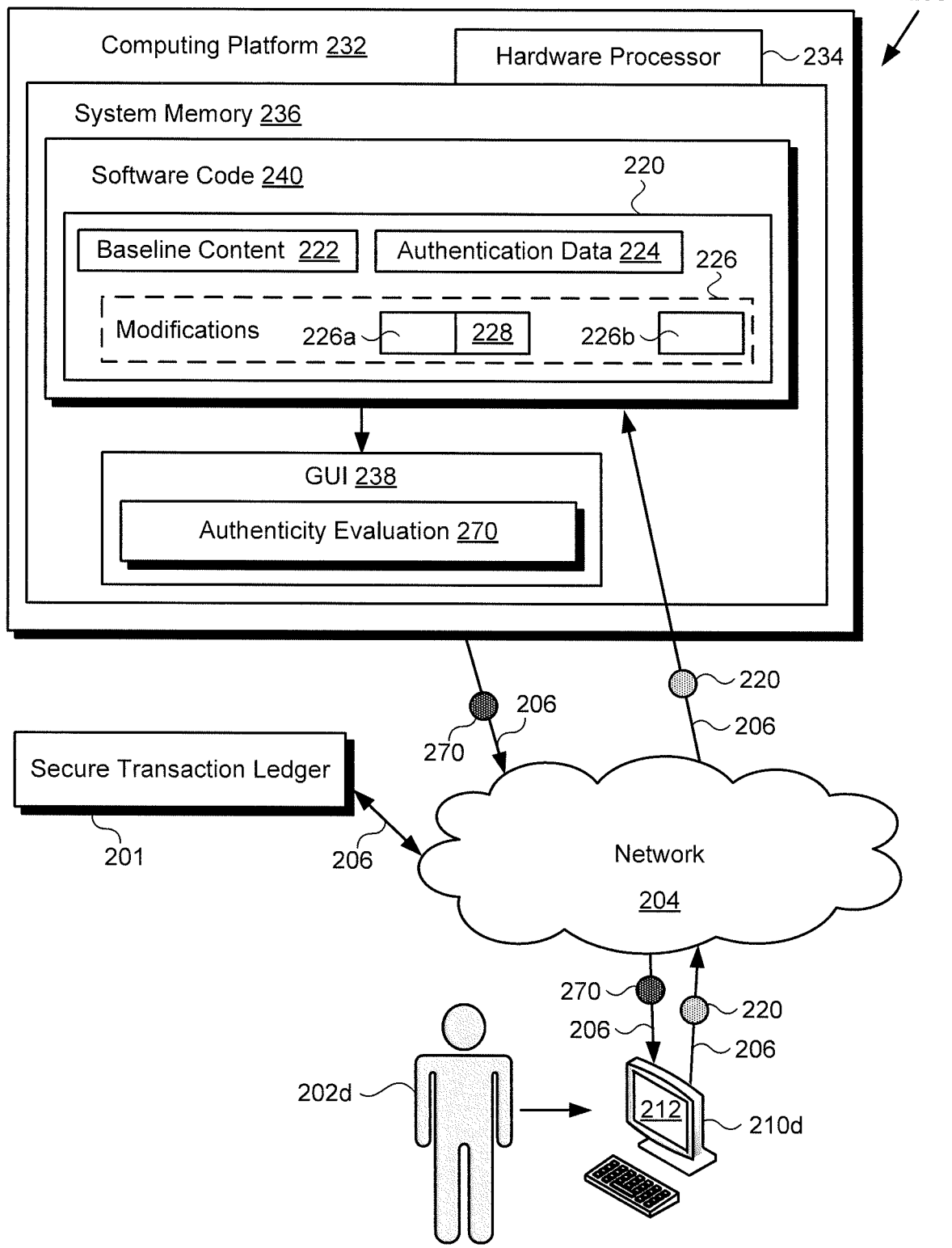
FIG. 2 shows a diagram of an exemplary system for assessing authenticity of modified content, according to one implementation.

FIG. 2 shows a diagram of exemplary system 230 for assessing authenticity of modified content, according to one implementation. As discussed below, system 230 may be implemented using a computer server accessible over a local area network (LAN) or may be implemented as cloud-based system. Moreover, and as shown in FIG. 2, system 230 includes computing platform 232 having hardware processor 234, and system memory 236 implemented as a non-transitory storage device. According to the present exemplary implementation, system memory 236 stores software code 240 providing graphical user interface (GUI) 238 including authenticity evaluation 270 configured to assess authenticity of modified content 220. As further shown in FIG. 2, modified content 220 includes baseline digital content 222, authentication data 224 for baseline digital content 222, and modifications 226 to baseline digital content 222. According to the exemplary implementation shown in FIG. 2, modifications 226 to baseline digital content 222 include modification 226a having authentication data 228, and modification 226b lacking such authentication data.

According to some implementations, each of modification 226a and 226b may represent all modifications made to baseline content 222 in modified content 220. That is to say, modification 226a may correspond to all modifications having authentication data 228, while modification 226b may correspond to all modifications lacking authentication data. However, in other implementations, each individual modification to baseline content 222, e.g., application of a sepia filter or other color change, a change in brightness, and the like, may be stored as a separate modification.

For example, each modification to baseline content 222 may be stored separately and may be bound together at the time of distribution or playback. In one implementation, for instance, an editing application may be configured to generate an "inverse Photoshop Document (.psd) file" when rendering modified content, wherein this "inverse .psd file" has instructions to perform transforms that negate all alterations applied to baseline content 222 when rendering, thereby enabling non-destructive preservation of baseline content 222 included in modified content 220. In one implementation, an extension of an Exchangeable Image File Format (EXIF) tag can be used to record modifications. The editing application may be configured to embed the "inverse .psd file" in the modifications, such that another user receiving modified content 220 may choose to extract it and execute it to re-generate baseline content 222. In another implementation, an editing application may be configured to determine whether baseline content 222 has been imported. If it has, the application may export baseline content 222 and modifications 226a and 226b separately.

As also shown in FIG. 2, system 230 is implemented within a use environment including secure transaction ledger 201, device 210d including display 212, and user 202d utilizing device 210d. It is noted that communication network 204 and network communication links 206 communicatively couple system 230 to device 210d, and may optionally couple system 230 to secure transaction ledger 201, so as to enable system 230 to receive modified content 220 from device 210d and to output authenticity evaluation 270 for rendering on display 212 of device 210d.

Modified content 220 including baseline digital content 222 corresponds in general to either or both of modified content 120a and further modified content 120b, both of which include baseline digital content 122. As a result, baseline digital content 222, and modified content 220 may share any of the characteristics attributed to respective baseline digital content 122 and either or both of modified content 120a and further modified content 120b by the present disclosure, and vice versa.

In addition, user 202d, device 210d including display 212, and secure transaction ledger 201 correspond respectively in general to user 102d, device 110d, and secure transaction ledger 101, in FIG. 1. As a result, user 202d, device 210d, and secure transaction ledger 201 may share any of the characteristics attributed to respective user 102d, device 110d, and secure transaction ledger 101 by the present disclosure, and vice versa. That is to say, although device 210d is shown as a desktop computer in FIG. 2, that representation is provided merely as an example. More generally, device 210d may be any suitable mobile or stationary computing device or system that implements data processing capabilities sufficient to provide a user interface, support connections to communication network 204, and implement the functionality ascribed to device 210d herein.

It is noted that, in various implementations, display 212 may be physically integrated with device 210d or may be communicatively coupled to but physically separate from device 210d. For example, where device 210d is implemented as a smartphone, laptop computer, or tablet computer, display 212 will typically be integrated with device 210d. By contrast, where device 210d is implemented as a desktop computer, display 212 may take the form of a monitor separate from device 210d in the form of a computer tower. It is further noted that display 212 may be implemented as a liquid crystal display (LCD), a light-emitting diode (LED) display, an organic light-emitting diode (OLED) display, or any other suitable display screen that performs a physical transformation of signals to light.

Regarding system 230, although the present application refers to software code 240 as being stored in system memory 236 for conceptual clarity, more generally, system memory 236 may take the form of any computer-readable non-transitory storage medium. The expression "computer-readable non-transitory storage medium," as used in the present application, refers to any medium, excluding a carrier wave or other transitory signal that provides instructions to hardware processor 234 of computing platform 232. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 2 depicts software code 240 as being stored in its entirety in system memory 236, that representation is also provided merely as an aid to conceptual clarity. More generally, system 230 may include one or more computing platforms 232, such as computer servers for example, which may be co-located, or may form an interactively linked but distributed system, such as a cloud-based system, for instance.

As a result, hardware processor 234 and system memory 236 may correspond to distributed processor and memory resources within system 230. Thus, it is to be understood that various features of software code 240, such as one or more of the features described below by reference to FIG. 3, may be stored and/or executed using the distributed memory and/or processor resources of system 230.

According to the implementation shown by FIG. 2, user 202d may utilize device 210d to interact with system 230 over communication network 204 to assess the authenticity of modified content 220. In one such implementation, computing platform 232 may correspond to one or more web servers, accessible over a packet-switched network such as the Internet, for example. Alternatively, computing platform 232 may correspond to one or more computer servers supporting a wide area network (WAN), a local area network (LAN), or included in another type of limited distribution or private network.

Figure 3:
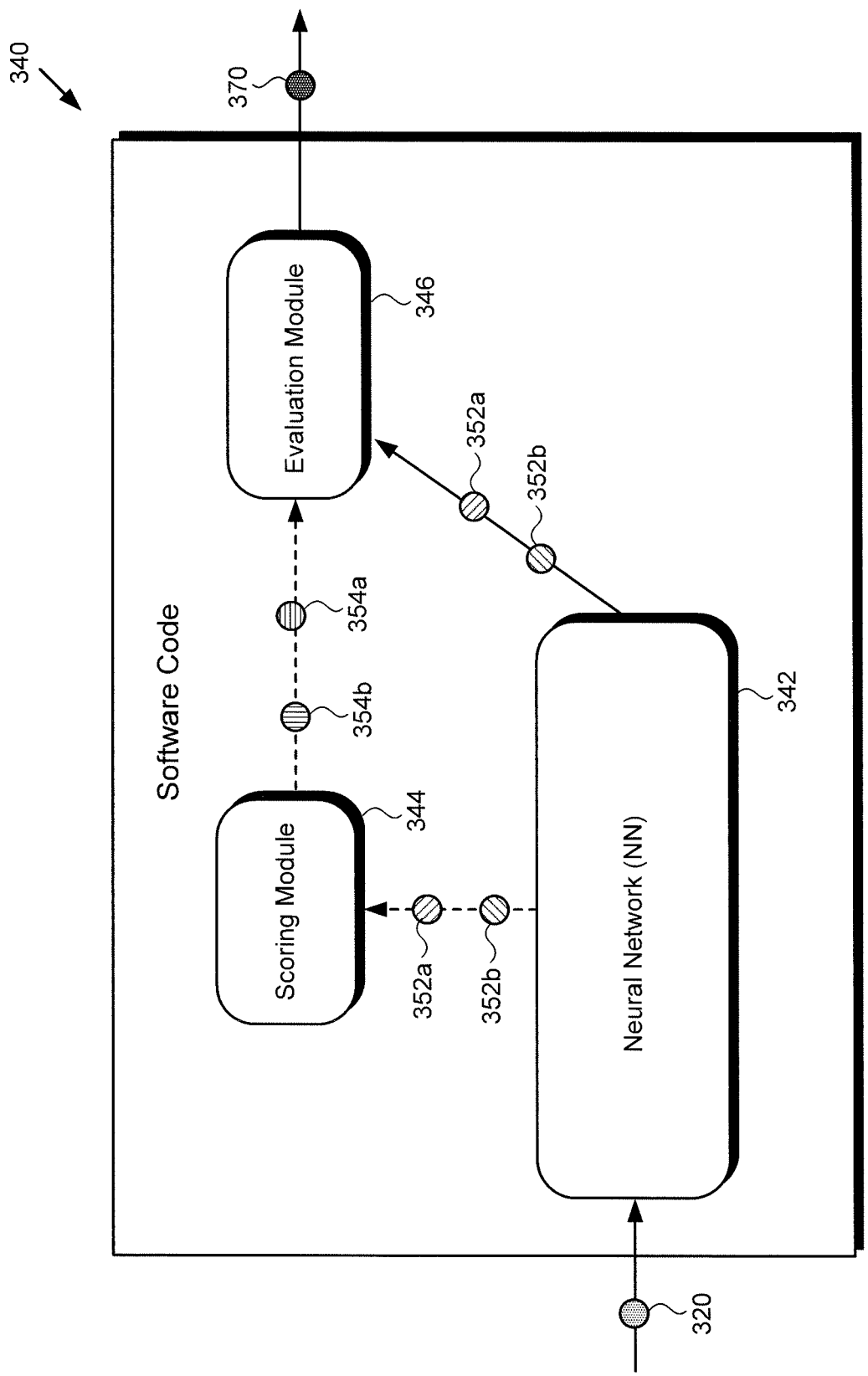
FIG. 3 shows an exemplary diagram of a software code including a neural network (NN) trained to assess the authenticity of modified content, according to one implementation.

FIG. 3 shows an exemplary diagram of software code 340 including neural network 342 trained to assess the authenticity of modified content 120a/120b/220 generated based on baseline digital content 122/222, in FIGS. 1 and 2, and including one or more modifications 226 to baseline digital content 122/222, according to one implementation. It is noted that, as defined in the present application, an artificial neural network, also known simply as a "neural network" (hereinafter "NN"), is a type of machine learning framework in which patterns or learned representations of observed data are processed using highly connected computational layers that map the relationship between inputs and outputs.

A "deep neural network," in the context of deep learning, may refer to an NN that utilizes multiple hidden layers between input and output layers, which may allow for learning based on features not explicitly defined in raw data. As such, various forms of NNs, including but not limited to deep neural networks, may be used to make predictions about new data based on past examples or "training data." In various implementations, NNs may be utilized to perform image analysis and/or natural-language analysis. It is noted that training data may be archived data, or may be content that has previously been created or modified by one of users 102a or 102b, for example, and has had the authenticity of that content creation or modification validated. In those use cases, the NN may learn the creative or editorial proclivities of the users, such as the devices and/or applications each user typically utilizes to create or modify content, as identified by metadata embedded or otherwise included in a data file containing the content, for example. Substantial deviations from those learned proclivities could be used to flag content or modifications to content as suspicious.

As shown in FIG. 3, in addition to NN 342, software code 340 includes evaluation module 346, and may include optional scoring module 344. As further shown in FIG. 3, NN 342 of software code 340 is configured to receive modified content 320 as an input, and to provide one or more authenticity assessments 352a and/or 352b as outputs. In some implementations, evaluation module 346 may be configured to generate authenticity evaluation 370 based on authenticity assessment 352a and/or authenticity assessment 352b.

However, in implementations in which software code 340 includes scoring module 344, NN 342 may also output authenticity assessment 352a and/or authenticity assessment 352b to scoring module 344, which may in turn provide one or more of assessment confidence score 354a and assessment confidence score 354b corresponding respectively to authenticity assessment 352a and authenticity assessment 352b to evaluation module 346. In those implementations, evaluation module 346 may be configured to generate authenticity evaluation 370 based on assessment confidence score 354a and/or assessment confidence score 354b, as well as on authenticity assessment 352a and/or authenticity assessment 352b.

Modified content 320 corresponds in general to modified content 220, in FIG. 2, as well as to either or both of modified content 120a and further modified content 120b, in FIG. 1, while authenticity evaluation 370 corresponds in general to authenticity evaluation 270, in FIG. 2. As a result, authenticity evaluation 370 may share any of the characteristics attributed to authenticity evaluation 270 by the present disclosure, and vice versa. Moreover, modified content 320 may share any of the characteristics attributed to modified content 220, modified content 120a, or further modified content 120b by the present disclosure, and vice versa. That is to say, like modified content 220, modified content 320 may include baseline digital content 222, authentication data 224 for baseline digital content 222, modification 226a to baseline digital content 222 having authentication data 228, and modification 226b to baseline digital content 222, lacking such authentication data.

Furthermore, software code 340 corresponds in general to software code 240, and those corresponding features may share any of the characteristics attributed to either corresponding feature by the present disclosure. Thus, like software code 340, software code 240 may include an NN corresponding to NN 342, as well as features corresponding respectively to evaluation module 346, and, in some implementations, optional scoring module 344.

Figure 4:
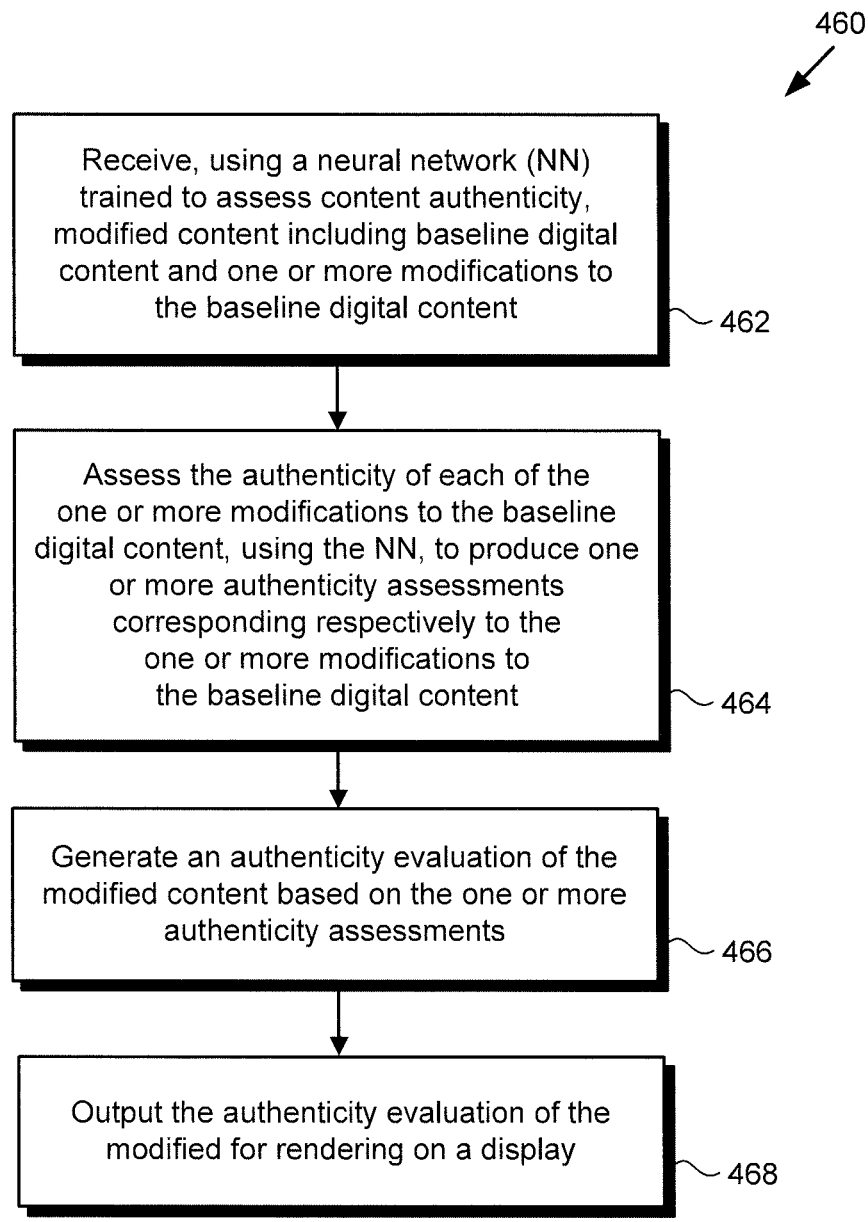
FIG. 4 shows a flowchart presenting an exemplary method for assessing authenticity of modified content, according to one implementation.

The functionality of software code 240/340 will be further described by reference to FIG. 4 in combination with FIGS. 2, 3, and 5. FIG. 4 shows flowchart 460 presenting an exemplary method for assessing authenticity of modified content, according to one implementation. With respect to the method outlined in FIG. 4, it is noted that certain details and features have been left out of flowchart 460 in order not to obscure the discussion of the inventive features in the present application.

Figure 5:
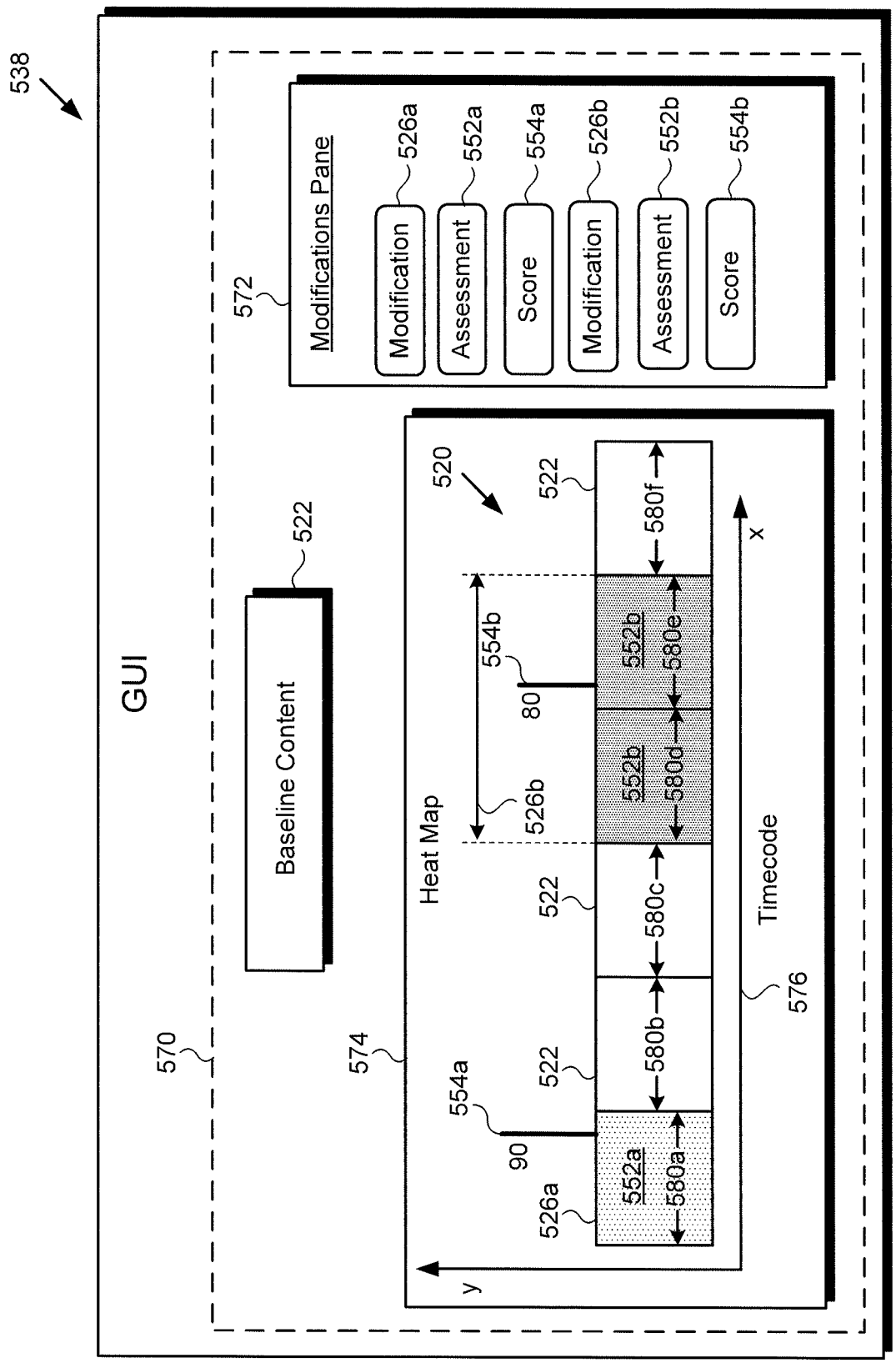
FIG. 5 shows an exemplary graphical user interface (GUI) provided by a system for assessing authenticity of modified content, according to one implementation.

FIG. 5 shows exemplary GUI 538 provided by software code 240/340 of system 230, according to one implementation. As shown in FIG. 5, exemplary GUI 538 provides authenticity evaluation 570 identifying baseline digital content 522, and including modifications pane 572 and optional visualization 574 in the form of an exemplary heat map of modified content 520. However, in other implementations, optional visualization 574 may take the form of a table, a list, or badges or icons distinguishing between unmodified segments of baseline digital content and modifications to the baseline digital content, to name a few examples. As further shown in FIG. 5, modifications pane 572 identifies modifications 526a and 526b to baseline digital content 522, and at least authenticity assessments 552a and 552b corresponding respectively to modifications 526a and 526b. Also shown to be included in modifications pane 572 in the exemplary implementation of FIG. 5 are assessment confidence scores 554a and 554b based on respective authenticity assessments 552a and 552b.

Authenticity evaluation 570 corresponds in general to authenticity evaluation 270/370 in FIGS. 2 and 3, while GUI 538 corresponds in general to GUI 238, in FIG. 2. That is to say, GUI 238 and authenticity evaluation 270/370 may share any of the characteristics attributed to respective GUI 538 and authenticity evaluation 570 by the present disclosure, and vice versa. Thus, although not shown in FIGS. 2 and 3, authenticity evaluation 270/370 may identify baseline digital content 222/522, and may have features corresponding respectively to modifications pane 572 and optional visualization 574.

Baseline digital content 522 corresponds in general to baseline digital content 122/222, in FIGS. 1 and 2. Thus, baseline digital content 522 may share any of the characteristics attributed to baseline digital content 122/222 by the present disclosure, and vice versa. Moreover, modified content 520 corresponds in general to modified content 220/320, in FIGS. 2 and 3, as well as to either or both of modified content 120a and further modified content 120b, in FIG. 1. As a result, modified content 520 may share any of the characteristics attributed to modified content 220/320, modified content 120a, or further modified content 120b by the present disclosure, and vice versa. That is to say, like modified content 220, modified content 520 may include baseline digital content 222/522, authentication data 224 for baseline digital content 222/522, modification 226a/526a to baseline digital content 222/522 having authentication data 228, and modification 226b/526b to baseline digital content 222/522, lacking such authentication data.

It is emphasized that FIGS. 2, 3, and 5 represent modified content 220/320/520 as including two modifications to baseline digital content 222/522, i.e., modifications 226a/526a and 226b/526b, merely in the interests of conceptual clarity. In some implementations, modified content 220/320/520 may include a single modification to baseline digital content 222/522, while in other implementations modified content 220/320/520 may include more, or many more than two modifications to baseline digital content 222/522.

According to the present exemplary implementation, the authenticity of each of modifications 226a/526a and 226b/526b is the subject of the assessment resulting in generation of authenticity evaluation 270/370/570. In some implementations, as shown in FIG. 5, authenticity evaluation 270/370/570 includes visualization 574 graphically depicting authenticity assessments 352a/552a and 352b/552b of respective modifications 226a/526a and 226b/526b to baseline digital content 222/522. For example, and as further shown in FIG. 5, in some implementations, visualization 574 may take the form of a heat map of modified content 220/320/520 based on authentication assessment 352a/552a and/or authentication assessment 352b/552b.

In some implementations, authenticity evaluation 270/370/570 may further include assessment confidence score 354a/554a determined based on authenticity assessment 352a/552a and/or assessment confidence score 354b/554b determined based on authenticity assessment 352b/552b. In those implementations, visualization 574 may take the form of a heat map of modified content 220/320/520 based on assessment confidence score 354a/554a and/or assessment confidence score 354b/554b.

Referring to exemplary heat map visualization 574, modified content 520 is segregated into segments 580a, 580b, 580c, 580d, 580e, and 580f (hereinafter "segments 580a-580f") arranged sequentially along horizontal x-axis, which may coincide with timecode 576 of modified content 520. In addition to segments 580a-580f, heat map visualization 574 includes authenticity assessments 552a and 552b of respective modifications 526a and 526b. That is to say segment 580a of baseline digital content 522 is modified in modified content 520 by modification 526a, and shows a visual depiction of authenticity assessment 552a of modification 526a determined by NN 342 of software code 340, in FIG. 3. In addition, segments 580d and 580e of baseline digital content 522 are modified in modified content 520 by modification 526b, and show a visual depiction of authenticity assessment 552b of modification 526b determined by NN 342 of software code 340.

It is noted that although heat map visualization 574 includes timecode 576, that representation is merely exemplary, and may be particularly relevant to use cases in which baseline content 522 or modified content 520 takes the form of a video clip or an audio track. In implementations in which baseline content 522 or modified content 520 takes the form of a digital photograph from which timecode 576 is omitted, heat map visualization 574 may be used to highlight areas within the digital photograph according to the likelihood that those areas have been modified. A determination regarding the likelihood that a particular area of a digital photograph has been modified may be performed based on changes when compared to other images created by the same user, device, or application used to create baseline content 522, or to other images created at the same location and/or time as baseline content 522.

It is further noted that the segmentation of modified content 520, into segments 580a-580f may occur as part of the authenticity assessment of modified content 520, or may arise naturally as a result of the nature of baseline content 522. For example, where baseline content 522 comprises a video clip including timecode 576 generated during creation of baseline content 522, segmentation of modified content 520 may be imposed using the same original timecode 576, so that content included in timecode increments or segments may be compared between baseline content 522 and modified content 520. Alternatively, an entirely new segmentation scheme, for example, according to timecode interval or frame sequence, could be imposed on baseline content 522 and modified content 520 when modified content 520 is assessed for authenticity. Moreover, in some implementations, more than one segmentation scheme may be applied during the assessment of modified content 520.

According to the exemplary implementation shown in FIG. 5, heat map visualization 574 shows all of the segments of baseline digital content that have been modified in modified content 520 concurrently to facilitate comparison of their respective authenticity assessments. However, in other implementations, it may be advantageous or desirable to display all or less than all segments included in modified content 520 concurrently. For example, in various implementations, visualization 574 may display all segments of modified content 520, only segments that have been modified, only segments including a modification that does not include an authentication assessment, user selected segments, and so forth.

It is noted that each of segments 580a-580f can be visually distinguished by its fill pattern or darkness in FIG. 5. In some implementations, color, hue, or the absence of color, rather than fill pattern or darkness, may also be used to visually distinguish among segments 580a-580f. That is to say, for example, substantially colorless or "white" segments 580b, 580c, and 580f of modified content 520 may be unchanged relative to their corresponding segments in baseline digital content 522. Again merely by way of example, segment 580a of modified content 520 including authenticated modification 526a to baseline digital content 522 may be depicted by a color such as green, indicating that it is safe to broadcast or otherwise distribute. By contrast, and still merely by way of example, segments 580d and 580e of modified content 520 including unverified modification 526b to baseline digital content 522 may be depicted by a color such as red to signal caution.

It is further noted that although in some implementations, modified segments 580a, 580d, and 580e may be colored to correspond to their respective authenticity assessments, in other implementations, it may be advantageous or desirable to color modified segments 580a, 580d, and 580e based on the extent to which those segments have been altered when compared to corresponding segments of baseline digital content 522. In those implementations, for example, an unmodified segment of modified content 520 may be colored green, a lightly modified segment might be colored yellow, and a heavily modified segment or one having undergone multiple layers of modifications might be colored red.

In some implementations, different weights could be assigned to different types of modifications. For example, aspect ratio changes and compression may be less likely the result of malicious or otherwise unauthorized modification than brightness changes or green-screened visual effects. Thus, a lightly modified segment may be identified as such based on its including a single low risk type of modification, while a heavily modified segment may be identified as such based on multiple modifications and/or a single high risk modification.

Each of segments 580a-580f may be a timecode interval of modified content 520, for example. That is to say, in some implementations, modified content 520 may be segmented based on timecode 576 of modified content 520. Alternatively, segments 580a-580f may be any other predetermined content segment appropriate to the nature of baseline digital content 522 and modified content 520. For example, where baseline digital content 522 and modified content 520 include audio, segments 580a-580f may each take the form of an audio track of modified content 520. In use cases where baseline digital content 522 and modified content 520 include video, segments 580a-580f of modified content 520 may correspond to one or more frames of video, one or more "shots" of video, or one or more scenes of video.

It is noted that, as used in the present application, a "shot" refers to a sequence of video frames that is captured from a unique camera perspective without cuts and/or other cinematic transitions. Thus, in various implementations, each of segments 580a-580f of modified content 520 may correspond to a single frame of video, a single shot of video including multiple individual video frames, or to a scene or scenes including multiple shots.

In implementations in which software code 240/340 includes scoring module 344, heat map visualization 574 may also show assessment confidence score 554a based on authenticity assessment 552a and assessment confidence score 554b based on authenticity assessment 552b. Assessment confidence scores 554a and 554b may be expressed numerically, for example as a number ranging from zero (no confidence) to 100 (substantial confidence). In the example of FIG. 5, assessment confidence score 554a is expressed numerically as 90, while assessment confidence score 554b is expressed numerically as 80. In another example, assessment confidence scores 554a and 554b may be expressed graphically, for example, by a bar having a different width or height. In the example of FIG. 5, assessment confidence score 554a is expressed graphically by a first bar, while assessment confidence score 554b is expressed graphically be a second bar, where the first bar has a greater height than the second bar since there is a greater level of confidence associated with assessment confidence score 554a than assessment confidence score 554b. Assessment confidence scores 554a, 554b may be expressed in one or more ways (e.g., numerically only, graphically only, text only, or a combination thereof).

Moreover, in some implementations, assessment confidence scores 554a and 554b report the estimated accuracy of respective authenticity assessments 552a and 552b. For example, where modification 526a includes authentication data 228, modification 526a may be assessed to be authentic, and that assessment may have a high assessment confidence score 554a. However, despite modification 526b being assessed as likely inauthentic, the low assessment of the authenticity of modification 526b may nevertheless have relatively high assessment confidence score 554b due to modification 526b lacking authentication data corresponding to authentication data 228, or due to its being otherwise unverified.

Referring now to FIG. 4 in combination with FIGS. 2 and 3, flowchart 460 begins with receiving, using NN 342, modified content 220/320 generated based on baseline digital content 222 and including one or more modifications 226a and/or 226b to baseline digital content 222 (action 462). As shown in FIG. 2, modified content 220 may be received from device 210d via communication network 204 and network communication links 206. Action 462 may be performed by software code 240/340 of system 230, executed by hardware processor 234, and using NN 342.

Flowchart 460 continues with assessing the authenticity of each of one or more modifications 226a and/or 226b to baseline digital content 222, using NN 342, to produce one or more authenticity assessments 352a and/or 352b corresponding respectively to one or more modifications 226a and/or 226b to baseline digital content 222 (action 464). In the interests of conceptual clarity, the actions outlined by flowchart 460 will be further described by reference to a specific use case in which modified content 220/320 includes modifications 226a and 226b to baseline digital content 222. However, it is noted that in other use cases, modified content 220/320 may include one of modifications 226a or 226b, or more, or many more modifications than modifications 226a and 226b.

Action 464 may be performed by software code 240/340, executed by hardware processor 234, and using NN 342, in a number of different ways. For example, and referring to FIGS. 1, 2, and 3, in implementations in which authorized modifications to baseline digital content 122/222 are tracked using secure transaction ledger 101/201, action 464 may be performed by obtaining the authorized modification history for baseline digital content 122/222 from secure transaction ledger 101/201 and comparing that authorized modification history with modifications 226a and 226b included in modified content 120a/120b/220/320. It is noted that in some implementations, the authorized modification history of baseline content 122/222 may be obtained by comparing baseline content 122/222 to modified content 120a, and then comparing further modified content 120b to modified content 120a and or to baseline content 122.

In one such use case, for instance, user 102b may be an authorized editor of baseline digital content 122/222 and may be issued a private key for that purpose, while user 102c may not be authorized to modify baseline digital content 122/222. In that use case, whenever user 102b holding the private key modifies baseline digital content 122/222, secure transaction ledger 101/201 is updated by editing data 121a. In some implementations, a user without a private key e.g., user 102c, may not be able to receive or edit content 122 or modified content 120a, thereby preventing premature disclosure or tampering. After production, the secure transaction ledger 101 could be made final by a lead director or by revoking keys held by user 102a and/or user 102b. Assessment of the authenticity of modifications 226a and 226b presupposes the capability of distinguishing portions of baseline digital content 122/222 that have been modified from those that have not. For example, referring to FIG. 5 in combination with FIGS. 1, 2, 3, and 4, action 464 may include using NN 342 to distinguish modified segments 580a, 580d, and 580e of modified content 120a/120b/220/320/520 from baseline segments 580b, 580c, and 580f. In some implementations, that distinction can be made based on intrinsic attributes of baseline digital content 122/222/

522, for example on a per segment basis, using authentication data 224 for baseline digital content 122/222/522.

The intrinsic attributes of baseline digital content 122/222/522 upon which authentication data 224 is based may include the content contained in each segment of baseline digital content 122/222/522 itself, as well as specific features of each segment. Referring to baseline segments 580b, 580c and 580f, each of those unmodified baseline segments could be identified as such based on the amount of data each contains, in bytes, and/or its data format, for example. Alternatively, or in addition, the intrinsic attributes of baseline segments 580b, 580c and 580f upon which authentication data 224 is based may include metadata identifying the device identification (device ID) of device 110a used to produce each of baseline segments 580b, 580c and 580f, the software application identification (application ID) of the digital content production software used to produce baseline segments 580b, 580c and 580f, and/or the identity of user 102a of device 110a. Furthermore, in some implementations, the intrinsic attributes of baseline segments 580b, 580c and 580f upon which authentication data 224 is based may include metadata identifying the date on which each of baseline segments 580b, 580c and 580f was produced, the respective times of their production, and/or the location of device 110a at the time of production of each of baseline segments 580b, 580c and 580f, based for example on data recorded by one or more position/location sensors of device 110a (position/location sensors of device 110a not shown in FIG. 1).

Any or all of the intrinsic attributes described above, including each of baseline segments 580b, 580c and 580f, may be hashed using any suitable cryptographic hash function, such as one of the Secure Hashtag Algorithm (SHA) family of hash functions, e.g., one of SHA-0, SHA-1, SHA-2, or SHA-3. Thus, authentication data 224 may include a hash value of each of baseline segments 580b, 580c and 580f as well as some, all, or none of the additional intrinsic attributes of baseline segments 580b, 580c and 580f described above. In some implementations, authentication data 224 may be appended to baseline digital content 122/222/522. For example, authentication data 224 may be appended as a "sidecar," as known in the art, to baseline digital content 122/222/522. However, in other implementations, it may be advantageous or desirable to embed authentication data 224 in baseline digital content 122/222/522.

Modified segments 580a, 580d, and 580e may then be distinguished from unmodified baseline segments 580b, 580c and 580f by generating validation data for each segment and comparing that validation data to authentication data 224 for each segment. In implementations in which authentication data 224 includes a hash value of each segment of baseline digital content 122/222/522, for example, validation data for each of segments 580a-580f may be generated by hashing each segment utilizing the same cryptographic hash function used to generate authentication data 224. The validation data generated in such a way for baseline segments 580b, 580c and 580f would match authentication data 224 for those segments, while validation data generated for modified segments 580a, 580d, and 580e would not match authentication data 224 for modified segments 580a, 580d, and 580e, thereby identifying modified segments 580a, 580d, and 580e as modified content.

Assessment of the authenticity of each of modifications 226a/526a and 226b/526b may be performed in a manner analogous to that described above for distinguishing modified segments 580a, 580d, and 580e from baseline segments 580b, 580c and 580f. For example, referring to authorized modification 226a/526a to baseline digital content 122/222/522 made by authorized user 102b using device 110b, the authenticity of modification 226a/526a may be assessed based on intrinsic attributes of modification 226a/526a, and using authentication data 228 for modification 226a/526a.

The intrinsic attributes of modification 226a/526a upon which authentication data 228 is based may include the content contained in modification 226a/526a itself, as well as specific features of modification 226a/526a, such as the data size of modification 226a/526a, and/or its data format, for example. Alternatively, or in addition, the intrinsic attributes of modification 226a/526a upon which authentication data 228 is based may include metadata identifying the device ID of device 110b used to produce modification 226a/526a, the application ID of the editing software used to produce modification 226a/526a, and/or the identity of user 102b of device 110b. Furthermore, in some implementations, the intrinsic attributes of modification 226a/526a upon which authentication data 228 is based may include metadata identifying the date on which modification 226a/526a was produced, the time of that production, and/or the location of device 110b at the time of production, based for example on data recorded by one or more position/location sensors of device 110b (position/location sensors of device 110b not shown in FIG. 1).

Any or all of the intrinsic attributes described above, including modification 226a/526a, may be hashed using any suitable cryptographic hash function, such as one of the SHA family of hash functions identified above. Thus, authentication data 228 may include a hash value of modification 226a/526a as well as some, all, or none of the additional intrinsic attributes of modification 226a/526a described above. In some implementations, authentication data 228 may be appended to modification 226a/526a as a "sidecar." However, in other implementations, it may be advantageous or desirable to embed authentication data 228 in modification 226a/526a. Embedding authentication data 228 in modification 226a/526a may advantageously avoid stripping authentication data 228 from modification 226a/526a.

The authenticity of modification 226a/526a may then be assessed by using NN 342 to generate validation data for modification 226a/526a using one or more of the intrinsic attributes of modification 226a/526a described above, and comparing that validation data to authentication data 228 for modification 226a/526a. In implementations in which authentication data 228 includes a hash value of modification 226a/526a, for example, the validation data for modification 226a/526a may be generated by hashing modification 226a/526a utilizing the same cryptographic hash function used to generate authentication data 228. That is to say, the validation data for modification 226a/526a may include a hash value of one or more intrinsic attributes of modification 226a/526a. The validation data generated in such a way for modification 226a/526a would match authentication data 228 for modification 226a/526a, thereby identifying modification 226a/526a as likely authentic. By contrast, modification 226b/526b lacking authentication data corresponding to authentication data 228 of authentic modification 226a/526a would remain unverified in such an assessment process.

Action 464 results in production of authenticity assessment 352a/552a corresponding to modification 226a/526a and/or production of authenticity assessment 352b/552b corresponding to modification 226b/526b, by NN 342. As discussed above, authenticity assessment 352a/552a may identify modification 226a/526a as an authentic modification to baseline digital content 122/222/522 by authorized user 102b. By contrast, authenticity assessment 352b/552b may identify modification 226b/526b as unverified and consequently likely inauthentic.

Flowchart 460 continues with generating authenticity evaluation 270/370/570 of modified content 120a/120b/220/320/520 based on authenticity assessment 352a/552a and/or authenticity assessment 352b/552b (action 466). As discussed above, in some implementations, software code 240/340 may omit scoring module 344. As shown in FIG. 3, NN 342 is configured to output authenticity assessment 352a and/or authenticity assessment 352b directly to evaluation module 346. Thus, in some implementations, hardware processor 234 may execute software code 240/340 to generate authenticity evaluation 270/370/570 of modified content 120a/120b/220/320/520 based on authenticity assessment 352a/552a and/or authenticity assessment 352b/552b alone, using evaluation module 346.

In implementations in which software code 240/340 includes scoring module 344, however, hardware processor 234 may execute software code 240/340 to determine assessment confidence score 354a/554a for segment 580a of modified content 120a/120b/220/320/520, and/or to determine assessment confidence score 354b/554b for segments 580d and 580e of modified content 120a/120b/220/320/520. As discussed above, assessment confidence scores 354a/554a and 354b/554b report the estimated accuracy of respective authenticity assessments 352a/552a and 352a/552b. For example, and as further discussed above, where modification 226a/526a is assessed to be authentic based on authentication data 228, that assessment may have a high assessment confidence score 354a/554a. Furthermore, despite modification 226b/526b being assessed as likely inauthentic, the low assessment of the authenticity of modification 226b/526b may nevertheless have relatively high assessment confidence score 354b/554b due to modification 226b/526b lacking authentication data corresponding to authentication data 228, or being otherwise unverified.

In implementations in which assessment confidence score 354a/554a and/or assessment confidence score 354b/554b are determined, authenticity evaluation 270/370/570 of modified content 120a/120b/220/320/520 may be generated using evaluation module 346 based on assessment confidence score 354a/554a and/or assessment confidence score 354b/554b, as well as on respective authenticity assessment 352a/552a and/or authenticity assessment 352b/552b.

The exemplary method outlined by flowchart 460 may conclude with outputting authenticity evaluation 270/370/570 of modified content 120a/120b/220/320/520 for rendering on a display (action 468). For example, as shown in FIG. 2, in some implementations, authenticity evaluation 270/370/570 of modified content 120a/120b/220/320/520 may be transmitted to device 210d, via communication network 204 and network communication links 206, for rendering on display 212. It is noted that, in some implementations, hardware processor 234 may execute software code 240/340 to perform actions 462, 464, 466, and 468 in an automated process from which human involvement may be omitted.

Thus, the present application discloses systems and methods for assessing authenticity of modified content that overcome the drawbacks and deficiencies in the conventional art. By using a trained NN to assess the authenticity of one or more modifications to digital content in its originally created or "baseline" version, the present application discloses a sophisticated authentication solution enabling nuanced assessments of modified content. In addition, by generating validation data for assessing modified content based on intrinsic attributes of the one or more modifications to the underlying baseline digital content, the present solution advantageously utilizes the characteristics of each modification to assess its authenticity.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
    a computing platform including a hardware processor and a system memory;
    a software code stored in the system memory, the software code including a neural network trained to assess an authenticity of a modified content generated based on a baseline digital content, the modified content including one or more modifications to the baseline digital content;
    the hardware processor being configured to execute the software code to:
        receive, using the neural network, the modified content;
        distinguish, using the neural network, the one or more modifications to the baseline digital content, from the baseline digital content;
        assess, using the neural network, an authenticity of each of the one or more modifications to the baseline digital content distinguished from the baseline digital content to produce one or more authenticity assessments corresponding respectively to the one or more modifications to the baseline digital content distinguished from the baseline digital content;
        generate an authenticity evaluation of the modified content based on the one or more authenticity assessments; and
        output the authenticity evaluation for rendering on a display.

2. The system of claim 1, wherein the neural network is configured to assess the authenticity of each of the one or more modifications to the baseline digital content based on a validation data of each of the one or more modifications generated by the neural network using one or more intrinsic attributes of each of the one or more modifications, and wherein the one or more intrinsic attributes include at least one or more of an amount of data in each segment of the baseline digital content, a data format of each segment of the baseline digital content, a device identification of each device used to produce each segment of the baseline digital content, a production date of each segment of the baseline digital content or a location of the device at a time of production of each segment of the baseline digital content.

3. The system of claim 2, wherein the validation data of each of the one or more modifications comprises a hash value of the one or more intrinsic attributes of each of the one or more modifications.

4. The system of claim 1, wherein the authenticity evaluation comprises a visualization graphically depicting the one or more authenticity assessments.

5. The system of claim 4, wherein the visualization comprises a heat map of the modified content based on the one or more authenticity assessments.

6. The system of claim 1, wherein the hardware processor is configured to further execute the software code to determine an assessment confidence score for one or more segments of the modified content based on the one or more authenticity assessments.

7. The system of claim 6, wherein the authenticity evaluation comprises a heat map of the modified content based on the assessment confidence score for the one or more segments of the modified content.

8. The system of claim 1, wherein each of the one or more segments of the modified content is segmented based on a timecode interval of the modified content.

9. The system of claim 1, wherein the modified content comprises video, and wherein each of the one or more segments of the modified content comprises one of a scene of video, a shot of video, or a frame of video.

10. The system of claim 1, wherein the modified content comprises audio, and wherein each of the one or more segments of the modified content comprises an audio track.

11. A method for use by a system including a computing platform having a hardware processor and a system memory storing a software code including a neural network trained to assess an authenticity of a modified content generated based on a baseline digital content, the modified content including one or more modifications to the baseline digital content, the method comprising:

receiving, by the software code executed by the hardware processor and using the neural network, the modified content;

distinguishing, by the software code executed by the hardware processor and using the neural network, the one or more modifications to the baseline digital content, from the baseline digital content;

assessing, by the software code executed by the hardware processor and using the neural network, an authenticity of each of the one or more modifications to the baseline digital content distinguished from the baseline digital content to produce one or more authenticity assessments corresponding respectively to the one or more modifications to the baseline digital content distinguished from the baseline digital content;

generating, by the software code executed by the hardware processor, an authenticity evaluation of the modified content based on the one or more authenticity assessments; and outputting, by the software code executed by the hardware processor, the authenticity evaluation for rendering on a display.

12. The method of claim 11, wherein the neural network is configured to assess the authenticity of each of the one or more modifications to the baseline digital content based on a validation data of each of the one or more modifications generated by the neural network using one or more intrinsic attributes of each of the one or more modifications, and wherein the one or more intrinsic attributes include at least one or more of an amount of data in each segment of the baseline digital content, a data format of each segment of the baseline digital content, a device identification of each device used to produce each segment of the baseline digital content, a production date of each segment of the baseline digital content or a location of the device at a time of production of each segment of the baseline digital content.

13. The method of claim 12, wherein the validation data of each of the one or more modifications comprises a hash value of the one or more intrinsic attributes of each of the one or more modifications.

14. The method of claim 11, wherein the authenticity evaluation comprises a visualization graphically depicting the one or more authenticity assessments.

15. The method of claim 14, wherein the visualization comprises a heat map of the modified content based on the one or more authenticity assessments.

16. The method of claim 11, further comprising determining, by the software code executed by the hardware processor, an assessment confidence score for one or more segments of the modified content based on the one or more authenticity assessments.

17. The method of claim 16, wherein the authenticity evaluation comprises a heat map of the modified content based on the assessment confidence score for the one or more segments of the modified content.

18. The method of claim 11, wherein each of the one or more segments of the modified content is segmented based on a timecode interval of the modified content.

19. The method of claim 11, wherein the modified content comprises video, and wherein each of the one or more segments of the modified content comprises one of a scene of video, a shot of video, or a frame of video.

20. The method of claim 11, wherein the modified content comprises audio, and wherein each of the one or more segments of the modified content comprises an audio track.

21. The system of claim 1, wherein prior to receiving the modified content, the system is configured to:

authenticate a validity of a creation of a content or a modification to the content; and train the neural network using training data obtained from the authenticated content.

22. The system of claim 21, wherein authenticating the validity authenticates that a user created or modified the content.

23. The system of claim 22, wherein authenticating the validity uses metadata in the content identifying a device or an application used to create or modify the content.

24. The method of claim 11, wherein prior to receiving the modified content, the method further comprising:

authenticating a validity a creation of a content or a modification to the content; and training the neural network using training data obtained from the authenticated content.

25. The method of claim 24, wherein authenticating the validity authenticates that a user created or modified the content.

26. The method of claim 25, wherein authenticating the validity uses metadata in the content identifying a device or an application used to create or modify the content.

* * * * *